United States Patent [19]

Sakamoto et al.

[11] Patent Number: 4,673,877

[45] Date of Patent: Jun. 16, 1987

[54] ZIRCONIUM LINER THICKNESS MEASURING METHOD AND AN APPARATUS THEREFOR FOR A ZIRCONIUM ALLOY TUBE

[75] Inventors: Takahide Sakamoto; Tatsuo Hiroshima, both of Hyogo, Japan

[73] Assignee: Sumitomo Metal Industries, Ltd., Osaka, Japan

[21] Appl. No.: 536,496

[22] Filed: Sep. 28, 1983

[30] Foreign Application Priority Data

Sep. 30, 1982 [JP] Japan .................................. 57-173034

[51] Int. Cl.⁴ ............................................... G01B 7/10
[52] U.S. Cl. .................................... 324/225; 324/220; 324/230; 376/245
[58] Field of Search ............... 324/238, 219, 220, 225, 324/229, 230, 231; 376/245

[56] References Cited

U.S. PATENT DOCUMENTS

| | | | |
|---|---|---|---|
| 2,641,841 | 6/1953 | Ladrach | 324/231 |
| 3,132,299 | 5/1964 | Hochschild | 324/238 |
| 3,358,225 | 12/1967 | Peugeot | 324/225 |
| 3,526,829 | 9/1970 | Noble | 324/238 |
| 4,047,103 | 9/1977 | Day et al. | 376/245 |
| 4,088,953 | 5/1978 | Sarian | 324/238 |
| 4,292,588 | 9/1981 | Smith | 324/229 |
| 4,503,392 | 5/1985 | Fastritsky et al. | 324/238 |

FOREIGN PATENT DOCUMENTS

| | | |
|---|---|---|
| 2657165 | 6/1978 | Fed. Rep. of Germany . |
| 3335080 | 4/1984 | Fed. Rep. of Germany ...... 324/230 |
| 58-166203 | 1/1983 | Japan .................................. 324/230 |
| WO83/01505 | 4/1983 | PCT Int'l Appl. ................. 324/230 |
| 1142145 | 2/1969 | United Kingdom ................ 324/231 |

OTHER PUBLICATIONS

"Thickness Measurements Using Eddy Current Techniques", by C. V. Dodd and W. A. Simpson, Jr., May 1973, pp. 73-79 and 84.

*Primary Examiner*—Salvatore Cangialosi
*Attorney, Agent, or Firm*—Burns, Doane, Swecker & Mathis

[57] ABSTRACT

A method and apparatus for measuring a liner thickness of a zirconium liner provided at the inner surface of a zirconium alloy tube, the principle of measurement of which is to insert coils into the tube to generate an eddy current, detect the impedance component in the direction perpendicular to the direction of coil impedance change caused by the lift-off variation between the coils and the inner surface of tube, and obtain the liner thickness on the basis of the impedance component. In a case where the lift-off variation is larger, the impedance component in the direction of coil impedance change caused by the lift-off variation is detected, so that the component is used to correct the impedance component perpendicular to the same, thereby obtaining the liner thickness in accordance with the corrected values.

12 Claims, 13 Drawing Figures

ZIRCONIUM LINER THICKNESS MEASURING METHOD AND AN APPARATUS THEREFOR FOR A ZIRCONIUM ALLOY TUBE

BACKGROUND OF THE INVENTION (1) Field of the Invention

This invention relates to a zirconium liner thickness measuring method and an apparatus for a cladding tube of multiple cladding type and comprising a metal barrier layer of zirconium provided at the inner surface of zirconium alloy tube among nuclear reactor fuel elements.

(2) Description of the Prior Art

Nuclear fuel for a power reactor is sealed into a cladding tube superior in corrosion resistance, non-reactibity and heat conductivity, which is assembled in lattice to constitute the fuel assembly.

A main object of cladding the nuclear fuel is to prevent chemical reaction between the nuclear fuel and the coolant or moderator and also to prevent a partially gaseous radioactive fission product from leaking into the coolant or moderator from the fuel. A zirconium alloy (Zilcaloy—2 or 4 as provided by ASTM SPECIAL TECHNICAL PUBLICATION 639) used as the material for the cladding tube is smaller in cross section for neutron absorption, strong under the existence of pure water or steam used usually as the reactor coolant or moderator and at a temperature of 400° C. or less, ductile, extremely stable, and not-reactive, thereby being said to be the cladding the nuclear fuel extremely superior in the steady state.

Now, the necessity for load follow-up operation has been raised as the atomic power plant has increased in number, in which when an output of fuel is abruptly raised, difference of thermal expansion between the fuel and the cladding tube generates an excessive local stress at the cladding tube, resulting in the possibility of causing stress corrosion cracking due to the mechanical interaction by the local stress and the chemical action of corroding the cladding tube by the fission product.

As the countermeasure to avoid such damage, various metal barriers have been tried to be interposed between the fuel and the cladding tube, among which it is the most hopeful to apply a liner of zirconium of proper purity. Such zirconium liner is about several 10 $\mu$m in thickness and utilized of its flexibility to modify local stress-strain occurred at the inner surface of cladding tube when the output abruptly rises, thereby aiming at raising resistance against the stress corrosion cracking, the zirconium liner being desirable to be formed at the inner surface of tube uniformly in the predetermined thickness, because the liner, when too smaller in thickness, cannot obtain the above effect, but when too larger in thickness, reduces the zirconium alloy material in thickness due to keeping the overall thickness constant to thereby make a problem of strength. Therefore, the liner thickness is said to be an important item for quality assurance, but conventional measurement of thickness depends on observation of cross section of cut tube by use of microscopic photograph, or data processing of the picture thereof. As a result, there is the defect that measurement of overall length is impossible as well as a long time for measurement. Hence, a measuring method capable of eliminating the above defect has been expected to be developed.

It is considered that the ultrasonic wave is utilized as the nondestructive measurement, but the wave, even when incident from the outer periphery, cannot distinguish the echo from the boundary from that from the bottom (liner surface) because of thin liner at the inner periphery of tube and moreover the extremely thin liner makes impossible the measurement from the inner periphery of tube.

Also, the electromagnetic induction measurement is taken into consideration, but in a case where a probe-type coil is inserted into the tube, a follow-up device of high accuracy is required for keeping the lift-off (a gap between the coil and the inner periphery of tube) constant, such follow-up device insertable therein being almost impossible to be manufactured.

There is a well-known measuring method utilizing the electromagnetic induction phenomenon or an eddy current as discussed below, which is disclosed in "Thickness Measurement Using Eddy Current Techniques" on Pages 73 to 84 in Material Evaluation published in May, 1973. This method is still defective in that an error caused by fluctuation of lift-off is not avoidable.

OBJECT OF THE INVENTION

A first object of the invention is to provide a measuring method and an apparatus, which can measure with high accuracy thickness of inner liner throughout overall length and periphery of tube by eliminating the influence of lift-off variation.

A second object of the invention is to provide a measuring method and an apparatus, which is measurable of thickness of liner with high accuracy by eliminating the influence of lift-off variation even larger in fluctuation.

A third object of the invention is to provide a measuring apparatus capable of measuring thickness of liner with high accuracy regardless of length of tube or measurement position axial thereof.

The above and further objects and features of the invention will more fully be apparent from the following detailed description with accompanying drawings.

DETAILED DESCRIPTION OF THE INVENTION

(1) Summary of the Invention

Figure 1:
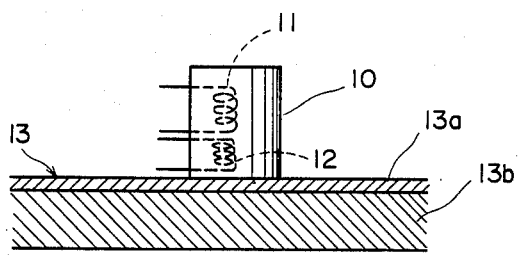
FIG. 1 is a schematic vertical sectional view explanatory of measurement condition.

The liner thickness measuring method of the invention is characterized in that a coil opposite one axial end thereof to the inner surface of cladding tube is inserted therein and excited in frequency selected based on the nominal liner thickness and penetration depth of eddy current induced in the inner periphery of tube by excitation to thereby detect an impedance component in the direction perpendicular to that of complex impedance change of coil caused by fluctuation of the lift-off between the coil and the inner periphery of tube, thus obtaining the liner thickness on the basis of the impedance component.

(2) Principle of the Invention

Next, the measuring method of the invention will be detailed. At first, explanation will be given on the reason that the electromagnetic induction method can measure the liner thickness.

A sensor 10 containing an exciting coil 11 and a detection coil 12 (both the coils may be in combined use) is disposed opposite to a liner layer 13a (the zirconium layer at a zirconium liner tube) of an object 13 to be measured and a current of frequency f (Hz) flows in the exciting coil 11, whereby an eddy current is induced in the object 13 to be measured, which is controlled by the resistivity and permeability of the object to be measured, gap (lift-off) between the object to be measured and the sensor 10 (exciting coil 11), dimension of the object to be measured, dimension of sensor 10 (exciting coil 11), and frequency for measurement.

In a case of zirconium tube, the liner layer 13a and base metal layer (zirconium alloy layer) 13b both are of relative permeability of 1 and the resistivity of liner 13a is $40 \times 10^{-8}$ $\Omega-m$ and that of base metal layer $74 \times 10^{-8}$ $\Omega-m$ (both by the aforesaid ASTM STP 639), the change of intensity and phase of eddy current depending on the difference between the resistivities, and on the liner thickness and base metal thickness. The eddy current has a skin effect of being easy to flow in proximity to the surface as much as possible, the penetration depth δ being given in the following equation:

$$\delta = \sqrt{\frac{2\rho}{\omega\mu}} \quad (m), \tag{1}$$

where

ω: angular frequency (2πf)

$\mu = \mu_r \times \mu_0$ (H/m)

$\mu_r$: relative permeability $\mu_0$: permeability of vacuum ($4\pi \times 10^{-7}$ H/m)

ρ: resistivity (Ω−m)

Therefore, when the frequency f is raised, δ is reduced than in Equation (1) (the skin effect becomes larger) so that in a case where the frequency is selected not to allow the intensity of eddy current to depend on the base metal thickness (generally, f is selected to have the relation of base metal thickness ≧ 5δ), the intensity of eddy current depends only on the liner thickness.

Hence, the magnetic field generated by the eddy current is picked up by detection coil 12 or impedance change thereof is picked up, thereby enabling to catch a change in intensity of eddy current, in turn that in liner thickness.

However, the eddy current as aforesaid is governed by the lift-off and impedance change of detection coil caused by the lift-off variation is remarkably larger than that caused by liner thickness variation, whereby the measurement precision is not expectable of its improvement as far as the lift-off is not constant. Hence, when the object to be measured is plate-like-shaped, the sensor 10 is pressed against the object to keep the lift-off constant, but in a case where the object is a tube of smaller diameter and moreover the measurement at the inner periphery is required, the aforesaid technique is not carried out and it is quite impossible to keep the lift-off constant throughout overall length of tube.

In brief, in a case where the base metal and liner are different in the permeability or resistivity, the electromagnetic induction method must principally measure the liner thickness, which has been well-known, but the problem concerning the lift-off has not been solved in fact.

This invention has solved the problem of lift-off by a device of a selection of driving frequency and processing the detected electric signals.

Figure 2:
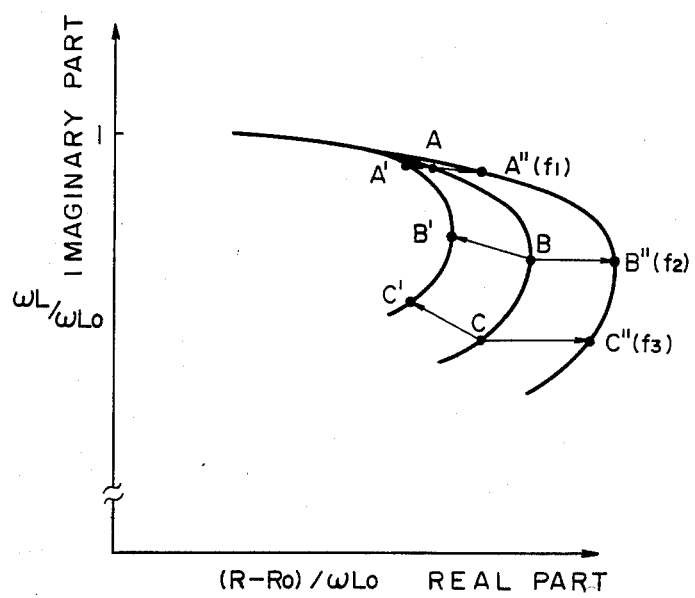
FIG. 2 is an impedance plane showing change of coil impedance.

Next, explanation will be given on the reason that the method of the invention can detect the liner thickness without being affected by the lift-off variation. FIG. 2 is an impedance plane showing change of impedance caused by the liner thickness and lift-off variation, in which the axis of abscissia represents $(R-R_0)/\omega L_0$ and the axis of ordinate $\omega L/\omega L_0$, and a curve A∼B∼C represents the measuring results at a liner thickness of 90 μm and lift-off of 0 μm, that A′∼B′∼C′ the same at a liner thickness of 90 μm and lift-off of 40 μm, and that A″∼B″∼C″ the same at a liner thickness of 50 μm and lift-off 0 μm, the point A, A′ and A″ corresponding to the driving frequency $f_1$, those B, B′ and B″ to $f_2$, and those C, C′ and C″ to $f_3$ (where $f_1 < f_2 < f_3$). R and L represent resistance component and inductance component of the detection coil when it approaches the object to be measured, $R_0$ and $L_0$ representing the same when the object to be measured is positioned infinitely apart from the detection coil.

Figure 3:
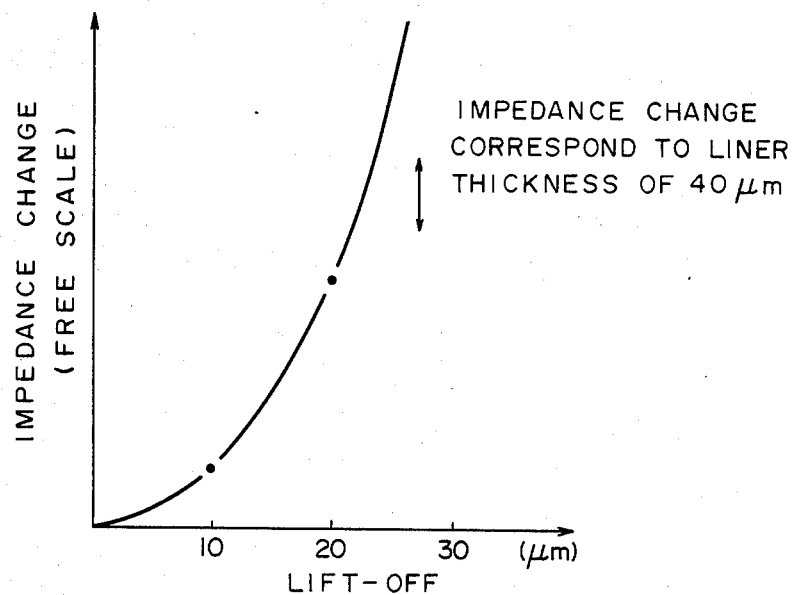
FIG. 3 is a graph of influence of lift-off on impedance.

For the measuring frequency $f_1$, the variation in liner thickness (90 μm→50 μm) appears as A→A″ and the variation in lift-off (0 μm→40 μm) as appears A→A′ as A→A″. In brief, the impedance changes caused by liner thickness variation and lift-off variation in a case of frequency $f_1$ appears in the same direction (in the Figure, the opposite direction), thereby not being distinguishable. To say accurately, a change in the absolute value of impedance enables evaluation of liner thickness, so that when impedance change caused by liner thickness variation is larger enough than that by the lift-off variation, a measurement error is small. However, the following problems are actually involved in making impossible the liner thickness measurement. FIG. 3 shows the relation between the lift-off (given in the axis of abscissa) at the zirconium liner tube and the impedance change (in the axis of ordinate) obtained in accordance with the driving frequency 1 MHz, the impedance change caused by a liner thickness variation by 40 μm being shown by the arrow, by which it is seen that the influence of liner thickness variation of 40 μm on the impedance change is about equal to that of lift-off variation by 10 μm on the same. In this case, it is substantially impossible to evaluate the liner thickness by the absolute value of impedance change. In one view, it is necessary for measurement of liner thickness with accuracy of 40 μm or less to hold the lift-off less than 1 μm, whereby such insurance of lift-off with respect to the sensor in the cladding tube is of course impossible.

In brief, the liner thickness measurement is impossible for the frequency $f_1$.

On the contrary, for the frequencies $f_2$ and $f_3$, the impedance change caused by the liner thickness is different in the direction and distinguishable from that by the lift-off variation. In other words, the liner thickness variation (90 μm→50 μm) appears as B→B''[C→C''] for the driving frequency $f_2[f_3]$ and the lift-off variation (0 μm→40 μm) appears as B→B'[C→C']. In brief, the changes are different in the direction from each other, thereby enabling to distinguish the impedance change by the liner thickness variation from that by the lift-off variation. In addition, the impedance change following increment of lift-off is of course directed toward the point (0, 1) on the axis of ordinate.

Thus, selection of proper frequency enables to distinguish the impedance changes caused by the lift-off and liner thickness variation, so that the aforesaid paper of Material Evaluation has proposed a method of selecting the frequency which phase difference θ in the direction of the aforesaid impedance change depends on the liner thickness and lift-off variation, thereby detecting θ by the aforesaid frequency.

Figure 4:
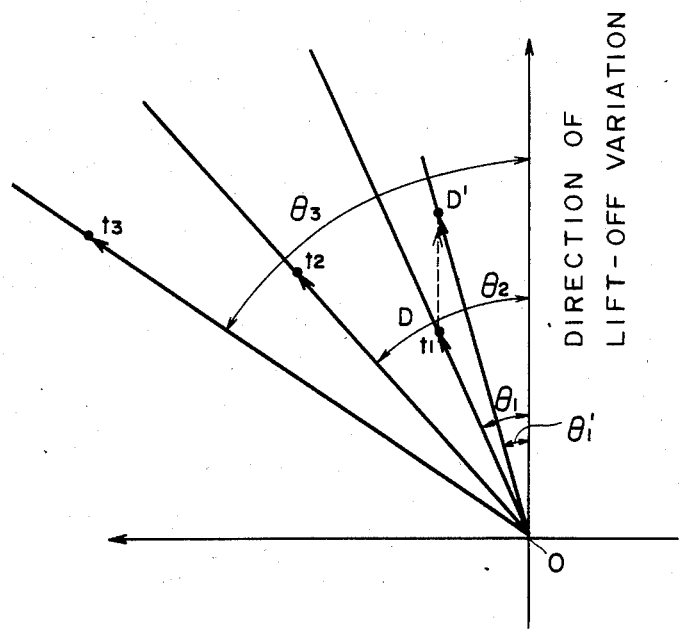
FIG. 4 is an illustration for the principle of measurement by a phase difference $\theta$.

FIG. 4 shows the principle of the above method, in which the direction of the lift-off variation is given in the axis of ordinate and phase differences $θ_1$, $θ_2$ and $θ_3$ in complex impedance of three specimens (each having liner thickness of $t_1$, $t_2$ or $t_3$) are given. When such phase angle θ varying corresponding to the liner thickness is measured and the preliminary calibration curve is used, it is substantially possible to obtain the liner thickness. An error caused by the lift-off variation is less in comparison with the method of detecting the absolute value of impedance change, but when the lift-off variation to move from the point D to D', the phase difference of liner thickness $t_1$ becomes $θ_1→θ_1'$, thereby not avoiding the occurrence of an error.

In brief,
it is basically possible to measure the liner thickness by the electromagnetic induction method, when a proper frequency is selected, the impedance change is dividable into the component by the lift-off variation and that by the liner thickness variation, and it is possible to obtain the liner thickness by measuring the phase difference with respect to the direction of impedance change caused by the lift-off variation, but the creation of error caused by the lift-off variation is inevitable.

(3) The Actual Method of the Invention

Figure 5:
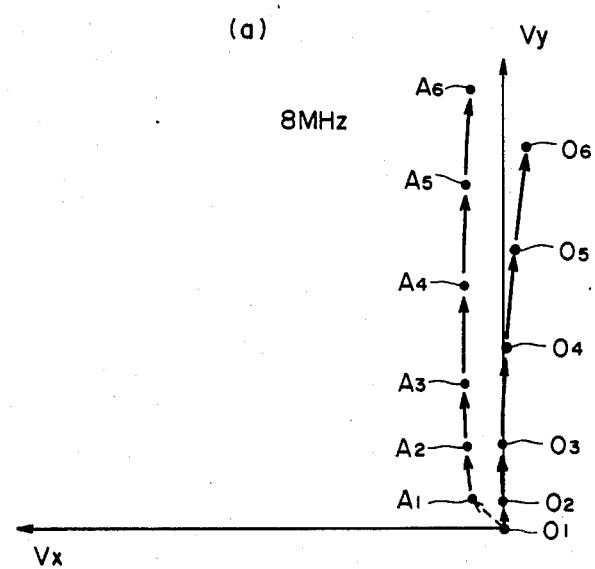
FIG. 5 shows graphs of locus of impedance change when the lift-off is varyed.
Figure 5:
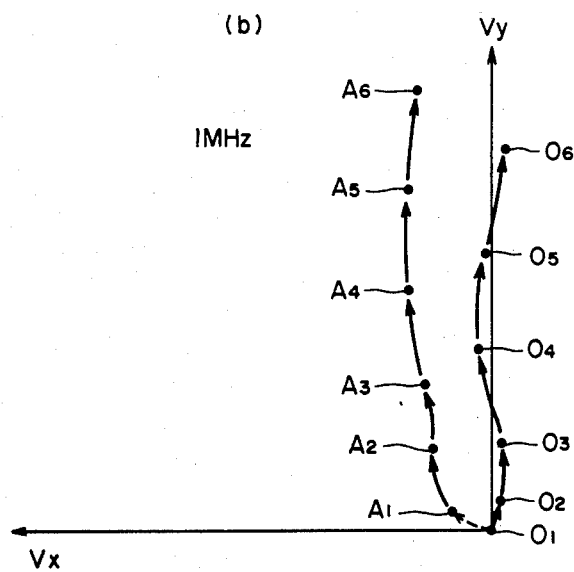

The measuring method of the invention is intended to obtain indication corresponding to the liner thickness by detecting the component substantially perpendicular to the direction of impedance change caused by the lift-off variation. It is necessary for measurement with accuracy that the impedance change caused by the lift-off variation is different in the direction from that caused by the liner thickness variation and also the locus of the former impedance change is preferable to be linear. FIG. 5(a) shows the impedance changing condition in accordance with the frequency of 8 MHz and FIG. 5(b) shows the same in accordance with that of 1 MHz, in which the direction of impedance change caused by the lift-off variation is given in the axis Vy (the axis of ordinate) and that caused by the liner thickness in the axis Vx (the axis of abscissa), reference O designates a liner thickness of 50 μm, A designates that of 90 μm, and the subscripts show the lift-off amount by 1 (0 μm), 2 (20 μm), 3 (40 μm), 4 (60 μm), 5 (80 μm), or 6 (100 μm). As seen from comparison of both the Figures, the locus by the frequency of 8 MHz is linear, which is preferable because the method of the invention uses the coordinate in the direction Vx as the information for obtaining the liner thickness. In brief, even when the lift-off variation (the subscript differs), the Vx component is desired to be equal, whereby in this example, the measurement by 8 MHz is preferable rather than by 1 MHz. In addition, the arrow from $O_1$ to $A_1$ represents the direction of impedance change caused by the liner thickness variation.

Figure 6:
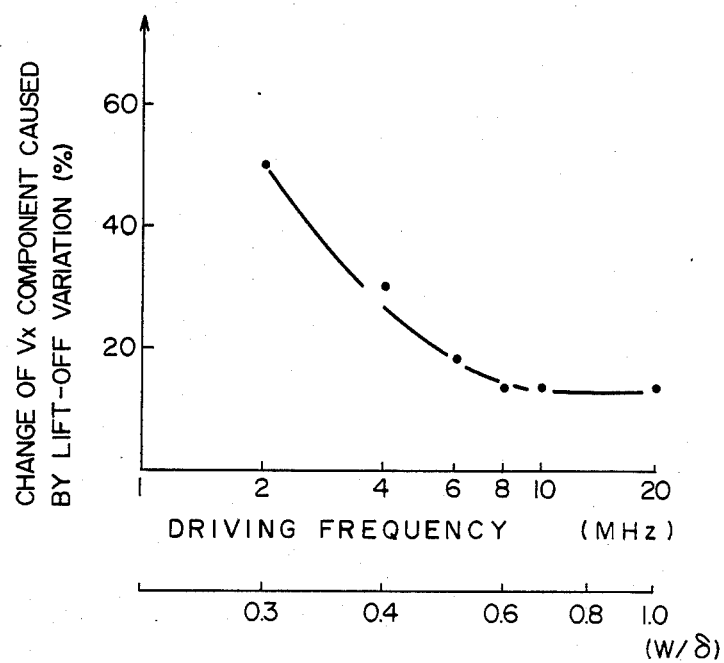
FIG. 6 is a graph showing the relation between W/$\delta$ and a change of $V_x$ component caused by lift-off variation.

Next, in order to investigate a proper range of frequency, the change of Vx component caused by lift-off variation of 60 μm [ratios of shifts as $O_1→O_4$ and $A_1→A_4$ in the Vx direction], when the lift-off varied from 0 μm to 60 μm, have been obtained by use of various frequencies in the case of liner thickness is 70 μm (standard liner thickness or nominal thickness). The results of the above are shown in FIG. 6, in which the Vx component decreases as the frequency increases, from which the frequency of 6 MHz or more is deemed preferable. The proper frequency range, however, is considered to depend on the liner thickness and penetration depth, so that when the axis of abscissa is normalized to be replaced by W/δ (where W: nominal liner thickness), the driving frequency range of W/δ more than 0.5 becomes proper. The frequency increases to reduce the error because the locus of impedance change following the lift-off variation becomes linear as aforesaid, but when W/δ exceeds 1, the eddy current is induced only at the skin of liner layer to result in a poor correlation between the liner thickness and the Vx component indication. Hence, W/δ is preferable to be included in a range of 0.5 to 1.

Figure 7:
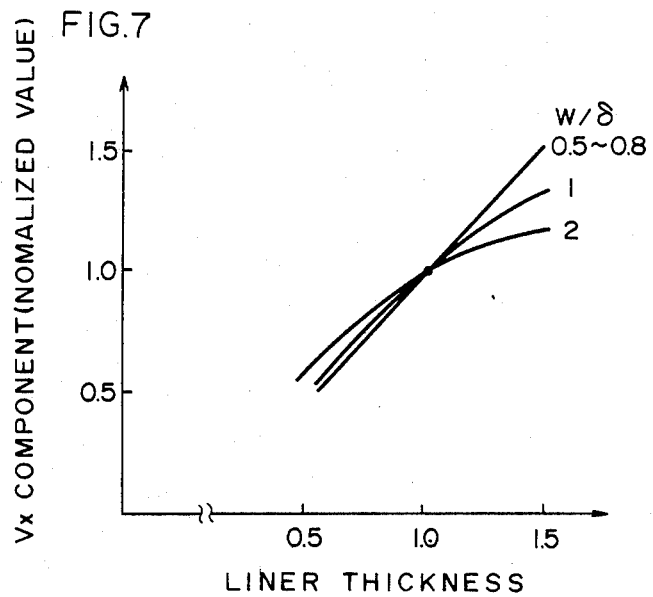
FIG. 7 is a graph of influence of W/$\delta$ on the $V_x$ component.

FIG. 7 is a graph showing the relation between the Vx component (normalized value) and the liner thickness (a ratio to the nominal liner thickness) obtained by using W/δ as the parameter regarding the nominal liner thickness of 70 μm, from which it is apparent that when W/δ becomes larger than 1, the Vx component indication value is saturated as the liner thickness becomes larger, thereby being inconvenient to measurement.

The aforesaid data was obtained by use of a detection coil of 1 mm in diameter, which is the value selected to detect the variation of liner thickness circumferentially of the tube with high resolution, the coil diameter being preferable to be about 0.5 to 1 mm from the viewpoint of facility of manufacturing.

Figure 8:
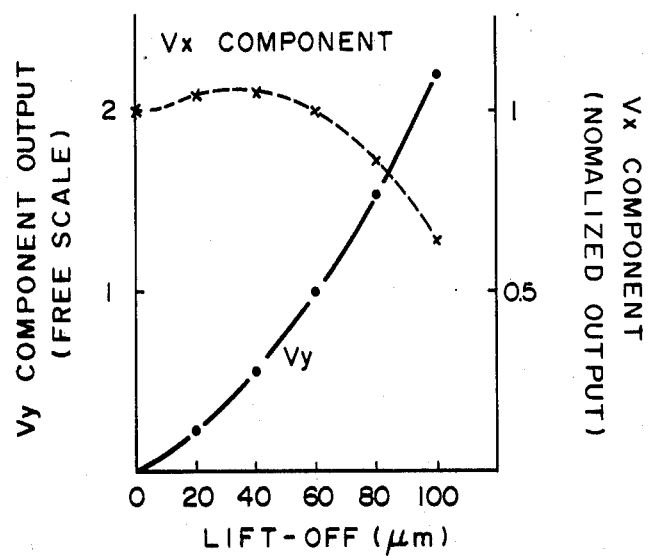
FIG. 8 is graph of the relation between the components $V_x$ and $V_y$ and the lift-off.

Now, for larger lift-off variation, the Vx component should be corrected by use of lift-off value, because a larger lift-off, even when the liner thickness is equal, reduces the Vx component measured value. The locus of impedance complex plane (where the liner thickness of 50 μm) as the same as FIG. 5(a) is divided into the Vx and Vy components and shown in FIG. 8. As seen from FIG. 8, the correlation is found between the component output in the direction of lift-off variation (the axis Vy) and that in the direction of liner thickness variation (the axis Vx), so that the Vy component is measured and the measured value, instead of lift-off, corrects the Vx component, thus enabling an accurate liner thickness to be obtained even when the lift-off variation is larger.

(4) Embodiment of the Invention

Figure 9:
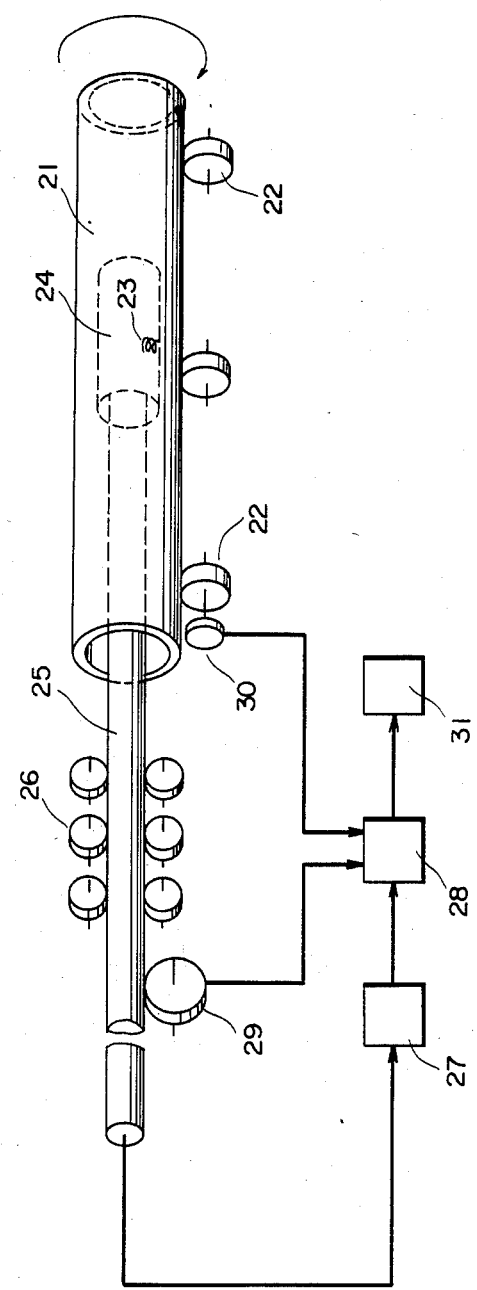
FIG. 9 is a view exemplary of a measuring method of the invention in practical use.

Next, an embodiment of the invention will be described according to FIG. 9. In the same figure, a zirconium liner tube 21 is rotated around the axis by turning rollers 22. A probe type coil 23 is mounted to a sensor holder 24 of smaller diameter than an inner diameter of tube 21, the sensor holder 24 being mounted to the utmost end of a support rod 25 disposed concentrically with the zirconium liner tube 21 and inserted therein to be moved at proper speed from one end to the other, thereby scanning and measuring the liner thickness in a spiral manner. In addition, reference numeral 26 designates pinch rollers for moving the support rod 25 forwardly and backwardly.

The coil 23 is connected to an impedance measuring instrument 27 so that its measured impedance information is read in an arithmetic unit 28, which is also adapted to be given the liner thickness measuring position information. In other words, a rotary encoder 29 rotatable in association with the touch rolls provided in a moving zone of support rod 25 is adapted to read the measurement positional information lengthwise of the liner tube 21 obtained by the coil 23 and a rotary encoder 30 provided at one turning roller 22 is adapted to read the information of rotary position or of circumferential measurement positional information of the liner tube 21 obtained by the coil 23. The arithmetic unit 28 computes a liner thickness by an input from impedance measuring instrument 27, the computed liner thickness and the positions lengthwise and circumference of tube 21 being displayed in a display unit 31.

Figure 10:
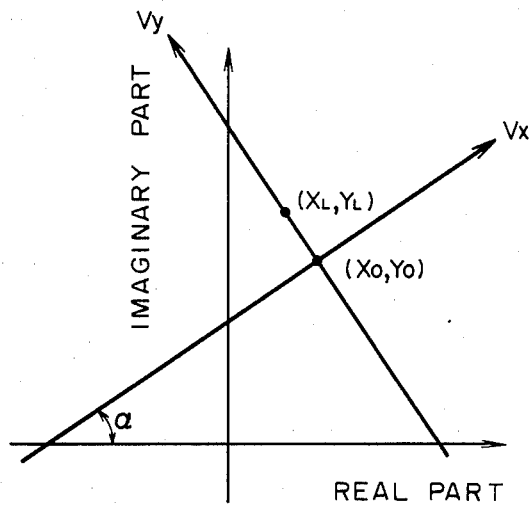
FIG. 10 is an illustration of coordinate transformation.

The arithmetic unit 28 processes data as follows. At first, the reference specimen well-known of liner thickness is used to measure the impedance value $(X_0, Y_0)$ (FIG. 10), the lift-off of the reference specimen is varyed to measure the impedance values $(X_L, Y_L)$, the values $(X_0, Y_0)$ $(X_L, Y_L)$ are read in the arithmetic unit 28 to compute the impedance changing direction (for example, an angle $\alpha$ on the basis of the axis of abscissa in the original coordinate system) caused by the lift-off variation, and the coordinate system of origins $(X_0, Y_0)$ and the axis Vx along one side of angle $\theta$ and the axis Vx perpendicular to the axis Vy, is set. The Vx component in the Vx—Vy coordinate system of data regarding the object to be measured obtained from the impedance measuring instrument 27 is computed to be converted into the liner thickness. When the lift-off variation is larger, the Vy component of course need only be obtained to correct the Vx component. The movement of support rod 25 and rotation of tube 21 of course enable the liner thickness measurement through overall length and circumference of tube 21.

Next, an apparatus in practical use for the measuring method of the invention, which enables measurement of less error and easy coordinate transformation, will be concretely detailed.

Figure 11:
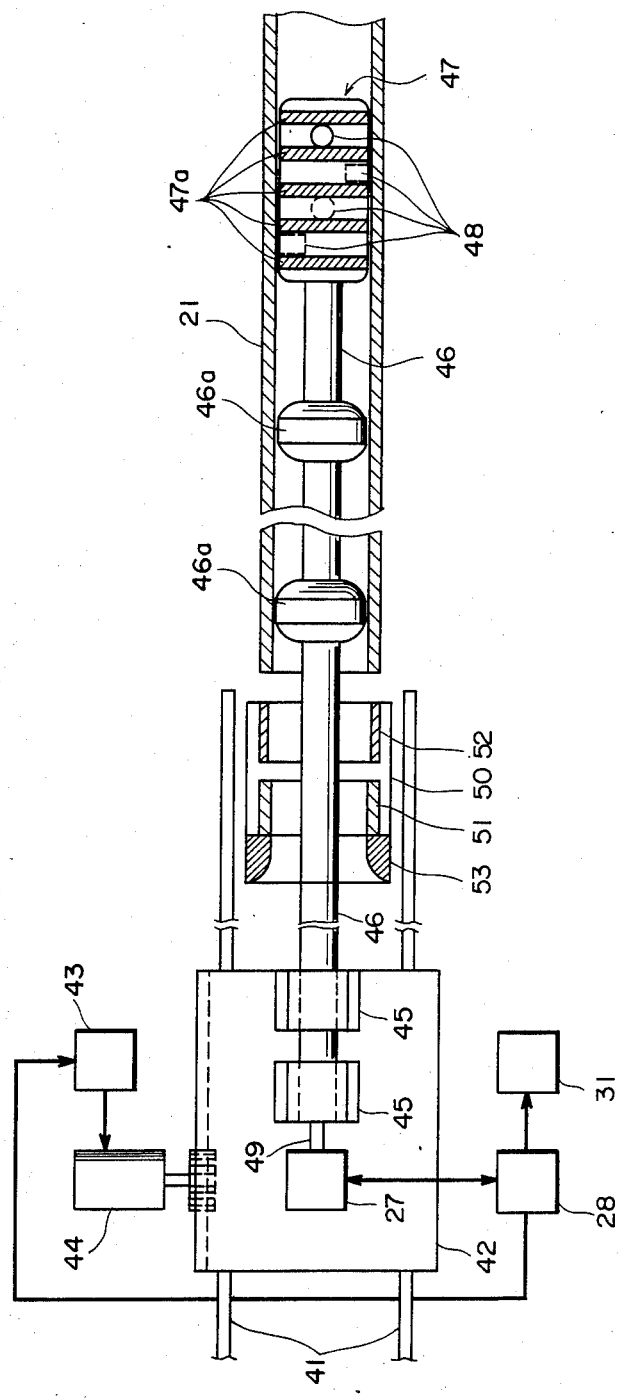
FIG. 11 is a schematic plane view exemplary of a measuring apparatus of the invention.

FIG. 11 is a schematic plane view exemplary of the apparatus of the invention, in which a pair of rails 41 are laid on the base, and a movable support truck 42 is placed on the rails 41 for running thereon so as to be movable leftwardly and rightwardly in the figure by a pulse motor 44 controlled by the arithmetic unit 28 and fed from a power source 43.

The movable support truck 42 loads thereon an impedance measuring instrument 27 and supports one end of a hollow scanning rod 46 to which coil 48 are to be mounted, the scanning rod 46 extending in the moving direction of truck 42, in other words, in the laying direction of rails 42 and being rigidly fixed by fixtures 45, 45 to the truck 42 at two different positions lengthwise thereof.

At the utmost end of the scanning rod 46 is mounted concentrically therewith a coil holder 47 of column-like shape and slightly smaller in diameter than a liner tube 21, the object to be measured. Four sets of coils 48 (each one set comprises, for example, two coils) are provided at the different positions axial of the coil holder 47 in relation of extending axially in parallel to the radial direction of the holder 47 and of being positioned near the periphery thereof. Also, each set of coil 48 is spaced at an angle of 90° circumferentially of holder 47 and separated from each other by a partition 47a of electromagnetic shielding material so as to eliminate the electromagnetic influence by the other coils 48.

Each coil 48 and the impedance measuring instrument 27 are connected by a cable 49 inserted through the scanning rod 46, the cable 49 being supported stationarily by terminals at the scanning rod 46 and the impedance measuring instrument 27, so that a switch (not shown) provided at the impedance measuring instrument 27 is adapted to enable sequential and repeated measurement of impedance of each coil 48, the switch being controlled by the arithmetic unit 28.

Between the coil holder 47 and the fixture 45, 45 insertion guide members 46a, 46a, each of short column-like shape and curved at both axial ends are fixed to the scanning rod 46. The liner tube 21, the object to be measured, is fixed at one ends of rails 41 concentrically with the scanning rod 46 and the coil holder 47, the coil holder 47 being inserted into the liner tube 21 from its opening at the truck 42 side and moved in association with the truck 42 toward the other opening thereof by the pulse motor 44. At the ends of rails 41 at the liner tube 21 fixing side is provided a stationary base 50 capable of fixing reference tubes 51 and 52 concentrical with the scanning rod 46, coil holder 47 or liner tube 21, the stationary base 50 providing at one end at the truck 42 side a trumpet-shaped guide tube 53 for guiding the coil holder 47 into the reference tubes 51 and 52. The reference tubes 51 and 52 are equal in its nominal liner thickness to the liner tube 21 to be measured, but different in an inner diameter from each other. For example, the tubes 51 and the liner tube 21 are equal in an inner diameter and tube 52 is slightly larger in the same than the tubes 51 and 21. In addition, a display unit 31 displays the measuring results.

Figure 12:
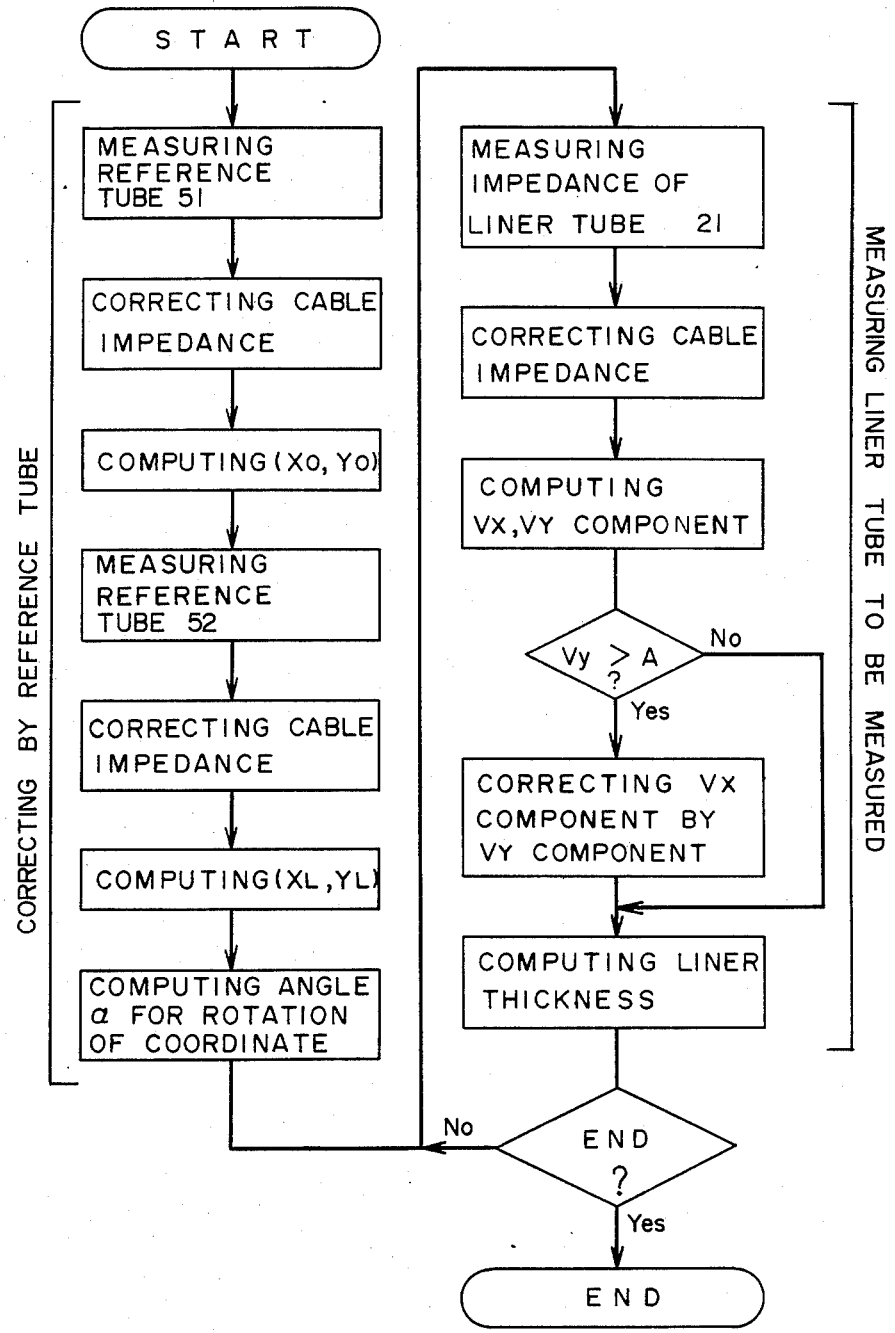
FIG. 12 is a flow chart of process of an arithmetic unit.

Next, the computing contents of arithmetic unit 28 will be described in accordance with the flow chart in FIG. 12.

Upon giving a command of starting measurement to the arithmetic unit 28 after the reference tubes 51, 52 and the liner tube 21 to be measured are fixed, the truck 42 and coil holder 47 escaping in position leftwardly in the FIG. 11 are moved rightwardly at the predetermined step so that the coil holder 47 is positioned within the reference tube 51. And the arithmetic unit 28 reads the impedance values of the predetermined coil (or all the coils) output from the impedance measuring instrument 27.

Impedance of the cable 49 between the impedance measuring instrument 27 and the coil 48 has previously been set in the arithmetic unit 28 and is used to carry out correction computation to obtain the actual complex impedance of the coil 48 to thereby compute the complex impedance $(X_0, Y_0)$.

Next, the arithmetic unit 28 controls the pulse motor 44 to move at the predetermined step and stops the coil holder 47 within the reference tube 52 so that the read-in of measured value from the impedance measuring instrument 27 and correction computation of cable impedance are carried out similarly to the above, at which time the complex impedance ($X_L$, $Y_L$) is computed. A difference between both the impedances is caused by a difference in an inner diameter of reference tubes 51 and 52.

Next, the arithmetic unit 28 computes an angle of $\alpha$ for rotation of coordinate system on the basis of both impedances.

After completion of the above preparation, the arithmetic unit 28 drives to control the pulse motor 44 to insert the coil holder 47 within the liner tube 21 to be measured and moves it sequentially rightwardly. Also, the arithmetic unit 28 reads the impedance measured values of four coils 48 each time at the pulse motor 44 is moved by the predetermined steps, carries out correction computation of cable impedance, and computes the Vy (the direction of impedance change caused by the lift-off variation) component and Vx (the direction perpendicular to Vy) component. And the Vy component is compared with the reference value A for deciding whether or not the correction for the large lift-off is necessary, so that when the Vy component is smaller than A, the liner thickness computation on the basis of the Vx component is carried out on the basis of data preliminarily given. When the Vy compoment is larger than A, the Vx component is corrected by data preliminarily given, whereby the liner thickness is computed on the basis of the corrected values.

The liner thickness thus computed is displayed in the display unit 31 by using a signal for driving the pulse motor 44 and output from the arithmetic unit 28, in relation with the axial measurement position of liner tube 21.

In a case where such apparatus is used, since the impedance measuring instrument 27 moves integrally with the coils 48, the position of cable 49 and relative position thereof to the scanning rod 46 are not changeable regardless of the position of coil 48 or measuring position thereof, thereby keeping the cable impedance constant, and moreover, the cable impedance is to be corrected, thereby avoiding the occurrence of error caused thereby.

Hence, such construction of apparatus of the invention is more effective in no change of cable impedance and in improvement of accuracy than the construction using a cable bearer and fixing the impedance measuring instrument 27 out of the truck 42.

(5) Effect

Figure 13:
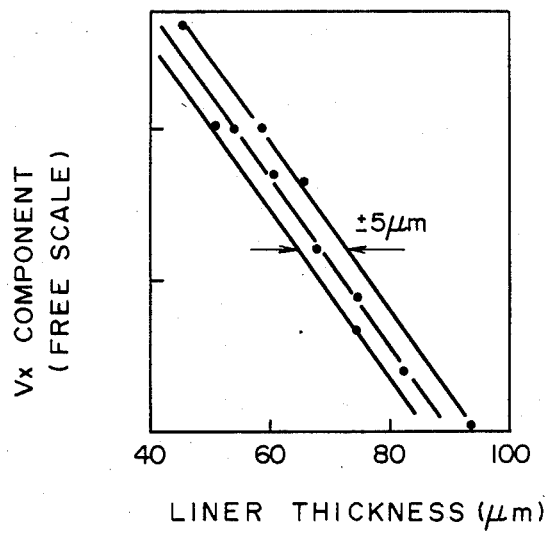
FIG. 13 is a graph showing accuracy of measurement of the invention.

FIG. 13 shows the result of having obtained under condition of the driving frequency of 8 MHz and W/$\delta \approx 0.62$ the relation between the measured values (the axis of abscissa) of liner thickness and the Vx component indication (the axis of ordinate), from which it is apparent that the present invention obtains the accuracy of $\pm 5$ $\mu$m. In addition, such data is used for conversion from Vx component indication to the liner thickness by the arithmetic unit 28.

As seen from the above, in the measuring method and apparatus therefor of the invention, the liner thickness measured values are not affected by the lift-off variation and also by overall thickness (including the zirconium alloy tube of base metal) and there is a proportional relation between the variation of liner thickness and that of Vx component of coil impedance within the measuring range necessary for practical use, thereby enabling an epoch-making measurement of zirconium liner thickness.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. An apparatus for measuring a liner thickness of a zirconium liner provided at the inner surface of a zirconium alloy tube, comprising:

a scanning rod adapted to move axially through said tube;

a coil holder mounted at the distal end of said scanning rod;

a coil supported by said coil holder such that an axial end of said coil is positioned adjacent the inner surface of said tube;

a movable support base carrying the near end of said scanning rod for axially moving said scanning rod;

an impedance measuring unit provided at said movable support base for measuring the complex impedance of said coil; and an arithmetic unit for computing a first component of said complex impedance and a second component of said complex impedance, said first component being a function of the distance between said coil and said inner surface, said second component being substantially perpendicular to said first component and providing an indication of the liner thickness.

2. The apparatus of claim 1, wherein said impedance measuring unit is connected with said oil by a cable, and said arithmetic unit corrects the measured complex impedance in accordance with the impedance of said cable.

3. The apparatus of claim 2, wherein a reference tube is provided for measuring the direction of the component of the complex impedance caused by the distance between said coil and said inner surface.

4. A liner thickness measuring method for measuring a thickness of a zirconium liner provided at the inside of a zirconium alloy tube, characterized in that a coil being formed so as to opposite the axial end thereof to the inner surface of said tube is inserted therein, said coil is excited by the frequency selected on the basis of a nominal liner thickness and a penetration depth of an eddy current generated on the inner surface of said tube by the excitation, an impedance component in the direction of change of a complex impedance of said coil caused by a variation in the lift-off between said coil and the inner surface of said tube and an impedance component in the direction substantially perpendicular to said direction of change are detected, and the latter impedance component is corrected by the former impedance component, thereby obtaining the liner thickness on the basis of said corrected values.

5. A liner thickness measuring method as set forth in claim 4, wherein said frequency is included in a range to satisfy the following conditions:

$0.5 \leq W/\delta \leq 1$, where
W: nominal liner thickness (m̂), and
δ: penetration depth of eddy current (m).

6. A liner thickness measuring method as set forth in claim 4, wherein said coil is made to face a reference specimen the same as an object to be measured, thereby measuring the complex impedance of said specimen, and then said coil is made to face said reference specimen or a reference specimen equivalent thereto in the state where the lift-off between said coil and said specimen is different from that during the previous measurement so that the complex impedance of said coil is measured, thereby obtaining the direction of impedance change by means of both the measured values.

7. A liner thickness measuring apparatus for measuring a thickness of a zirconium liner provided at the inside of a zirconium alloy tube, characterized by providing a scanning rod to be inserted into said tube,
a coil holder mounted to said scanning rod at the utmost end side thereof,
one or more coils supported to said coil holder in relation of being opposite an axial end of each of said coils to the inner peripheral surface of said tube,
a movable support base carrying said scanning rod at the root end side thereof and moving said scanning rod axially thereof,
an impedance measuring instrument for said coils, which is provided at said movable support base, and
an arithmetic unit for computing the component in the particular direction of the complex impedance measured by said impedance measuring instrument.

8. A liner thickness measuring apparatus for measuring a thickness of a zirconium liner provided at the inside of a zirconium alloy tube, characterized by providing a scanning rod to be inserted into said tube,
a coil holder mounted to said scanning rod at the utmost end side thereof,
one or more coils supported to said coil holder in relation of being opposite an axial end of each of said coils to the inner peripheral surface of said tube,
a movable support base carrying said scanning rod at the root end side thereof and moving said scanning rod axially thereof,
an impedance measuring instrument provided at said movable support base and connected with said coils by cable, and
an arithmetic unit which corrects the measuring results of said impedance measuring instrument by means of said cable impedance, thereby computing the component in the particular direction of said corrected complex impedance.

9. A liner thickness measuring apparatus as set forth in claim 8, wherein a reference tube for deciding said component in the particular direction is disposed in a moving zone of said coil out of said tube.

10. A method for measuring a liner thickness of a zirconium liner provided at the inner surface of a zirconium alloy tube, comprising the steps of:

positioning a coil adjacent said zirconium liner;
exciting said coil with an electric current having a frequency selected as a function of a nominal liner thickness and a penetration depth of an eddy current generated on said inner surface;
detecting a first impedance component from a complex coil impedance, said first component being a function of the distance between said coil and said inner surface;
detecting a second impedance component from said complex coil impedance, said second component having a direction substantially perpendicular to said first component; and
correcting said second impedance component in accordance with said first impedance component, the liner thickness measurement being obtained on the basis of said corrected impedance component.

11. The method of claim 10, wherein said frequency is selected to satisfy the following condition:

$0.5 \leq W/\delta \leq 1$ where W is the nominal liner thickness and δ is the penetration depth of the eddy current.

12. The method of claim 10, further including the steps of:

measuring the complex impedance of a reference specimen substantially the same as the zirconium test object with said coil spaced a first distance from said reference specimen;
measuring the complex impedance of said reference specimen with said coil spaced a second distance from said reference specimen; and
detecting the direction of said first impedance component in accordance with the complex impedance measurements at said first and second distances.

* * * * *